US 8,446,992 B2

(12) United States Patent
Duello et al.

(10) Patent No.: US 8,446,992 B2
(45) Date of Patent: May 21, 2013

(54) DIGITAL EXCITER HAVING PILOT SIGNAL COMPENSATION

(75) Inventors: Wayne Douglas Duello, Hamilton, OH (US); Scott Frederick Halozan, Liberty Township, OH (US)

(73) Assignee: Harris Corporation, Melbourne, FL (US)

( * ) Notice: Subject to any disclaimer, the term of this patent is extended or adjusted under 35 U.S.C. 154(b) by 460 days.

(21) Appl. No.: 12/691,814

(22) Filed: Jan. 22, 2010

(65) Prior Publication Data

US 2011/0182386 A1 Jul. 28, 2011

(51) Int. Cl.
*H04L 27/06* (2006.01)

(52) U.S. Cl.
USPC .......................................... 375/344; 375/264

(58) Field of Classification Search
None
See application file for complete search history.

(56) References Cited

U.S. PATENT DOCUMENTS

| 5,418,818 | A | * | 5/1995 | Marchetto et al. | 375/264 |
| 6,281,935 | B1 | | 8/2001 | Twitchell et al. | |
| 6,671,291 | B1 | * | 12/2003 | Soliman | 370/503 |
| 7,756,493 | B2 | * | 7/2010 | Braithwaite | 455/127.1 |
| 2006/0078071 | A1 | * | 4/2006 | Lee | 375/326 |
| 2007/0243836 | A1 | * | 10/2007 | Cabrera et al. | 455/102 |

* cited by examiner

*Primary Examiner* — Leon-Viet Nguyen
(74) *Attorney, Agent, or Firm* — Tarolli, Sundheim, Covell & Tummino LLP

(57) ABSTRACT

A digital exciter is presented herein for use in RF broadcasting and wherein the exciter employs pilot signal compensation. This includes an input digital circuit for receiving a modulated digital data at an input sample rate for RF broadcasting at a desired RF frequency. The pilot frequency may be displaced from a desired location at the frequency band because of an error in the input sample rate. A digital compensator determines whether the pilot frequency is displaced and provides a digital correction signal in accordance therewith. A digital correction circuit corrects the pilot frequency in accordance with the correction signal.

14 Claims, 2 Drawing Sheets

DIGITAL EXCITER HAVING PILOT SIGNAL COMPENSATION

FIELD OF THE INVENTION

1. Technical Field

The present invention relates to RF broadcasting and, more particularly, to a digital exciter for RF broadcasting having pilot frequency compensation.

2. Description of the Prior Art

In proposed digital television (DTV) systems, a digital signal bearing both video and audio data may be sent from a signal source, such as a television studio, to an RF-transmission site that may not be co-located with the studio. Thus, the video and audio data are transmitted from the studio using conventional communication techniques, such as microwave links. This signal, often referred to as the transport signal, may contain both the data and the clock for the data. The transmission site may use the clock for the purpose of recovering the data. If the clock is inaccurate or drifts, inaccuracies work into the signal that is broadcast from the transmission site. Given the importance of maintaining accurate broadcast frequency, frequency errors caused by inaccurate clocks may be unacceptably high.

The Advanced Television Standards Committee (ATSC) requires that a frequency known as the pilot frequency be controlled in accordance with various Federal Communications (FCC) requirements. The typical frequency band with digital television is on the order of 6 MHz. A pilot signal should be at a particular location, such as at a band edge. The pilot signal may be displaced from the band edge because of a frequency error caused by an error in the input sample rate.

The prior art includes U.S. Pat. No. 6,281,935 (Twitchell). This patent discloses an analog solution to pilot frequency alignment.

SUMMARY OF THE INVENTION

In accordance with the present invention, a digital exciter is provided for use in RF broadcasting and it employs pilot signal compensation. This exciter includes an input digital circuit for receiving digital data at an input sample rate. This is used for RF broadcasting at a desired RF frequency. The pilot frequency may be displaced from a desired location, such as at a band edge because of an error in the input sample rate. The invention includes a digital compensator that determines whether the pilot frequency is displaced and provides a digital correction signal. A digital correction circuit corrects the pilot frequency in accordance with information provided by the correction signal.

In accordance with a more limited aspect of the present invention, a frequency conversion circuit converts the frequency to a higher digital intermediate frequency.

In accordance with a still further aspect of the present invention, the compensator includes a digital counter for counting clock pulses from a clock source to provide a count used to indicate any displacement of the pilot frequency.

In accordance with a still further aspect of the present invention, a computer is programmed to receive the count and determine the extent of any displacement frequency error as a function of the count.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DETAILED DESCRIPTION OF THE INVENTION

This invention is directed to a digital exciter for use in RF broadcast. The exciter provides pilot signal compensation to compensate for pilot frequency displacement from a desired location within the broadcast frequency band. The displacement may be the result of an error in the input sample rate of the data supplied to the exciter. The exciter provides an output signal which is placed at the desired RF frequency by mixing the modulated signal at an intermediate frequency (IF) with output from a local oscillator (LO). The LO frequency is actively controlled by using a phase locked loop (PLL) with precision input reference. The intermediate frequency (IF), in this embodiment, is nominally at 140 MHz and is exact if the input sample data rate has no error. The modulated signal is output at the intermediate frequency from a digital to analog converter (DAC). The pilot signal, in the absence of an error, should be on the band edge.

Figure 1A:
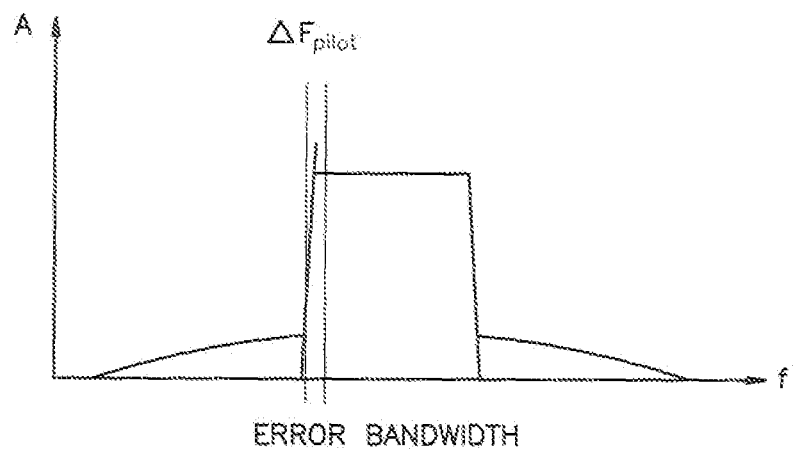
FIG. 1A is an amplitude versus frequency plot for a digital signal and illustrating a displaced pilot signal.
Figure 1B:
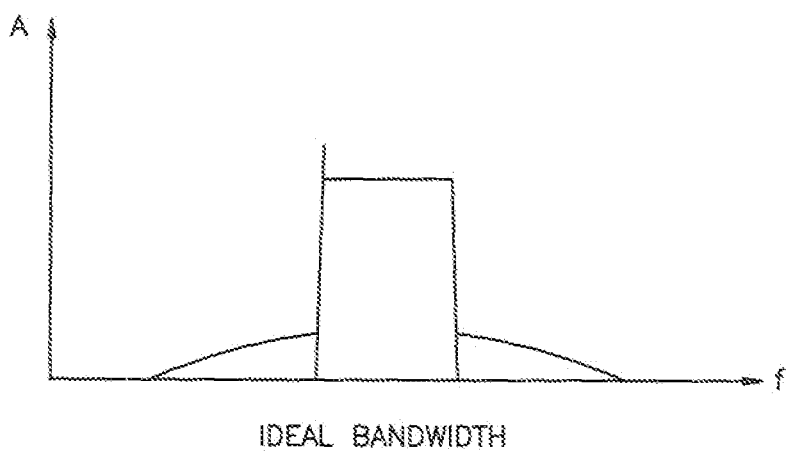
FIG. 1B is an amplitude versus frequency plot similar to that of FIG. 1A, but showing an ideal bandwidth with the pilot signal being at the correct RF frequency.

The forgoing is illustrated in FIGS. 1A and 1B. FIG. 1A is an amplitude versus frequency showing a pilot frequency that is offset from the band edge, as is indicated by $\Delta F_{pilot}$. FIG. 1B illustrates a similar showing but with the pilot frequency correctly located at the band edge. It uses the compensation that is provided by this invention to maintain the pilot at the band edge, as in FIG. 1B.

Figure 2:
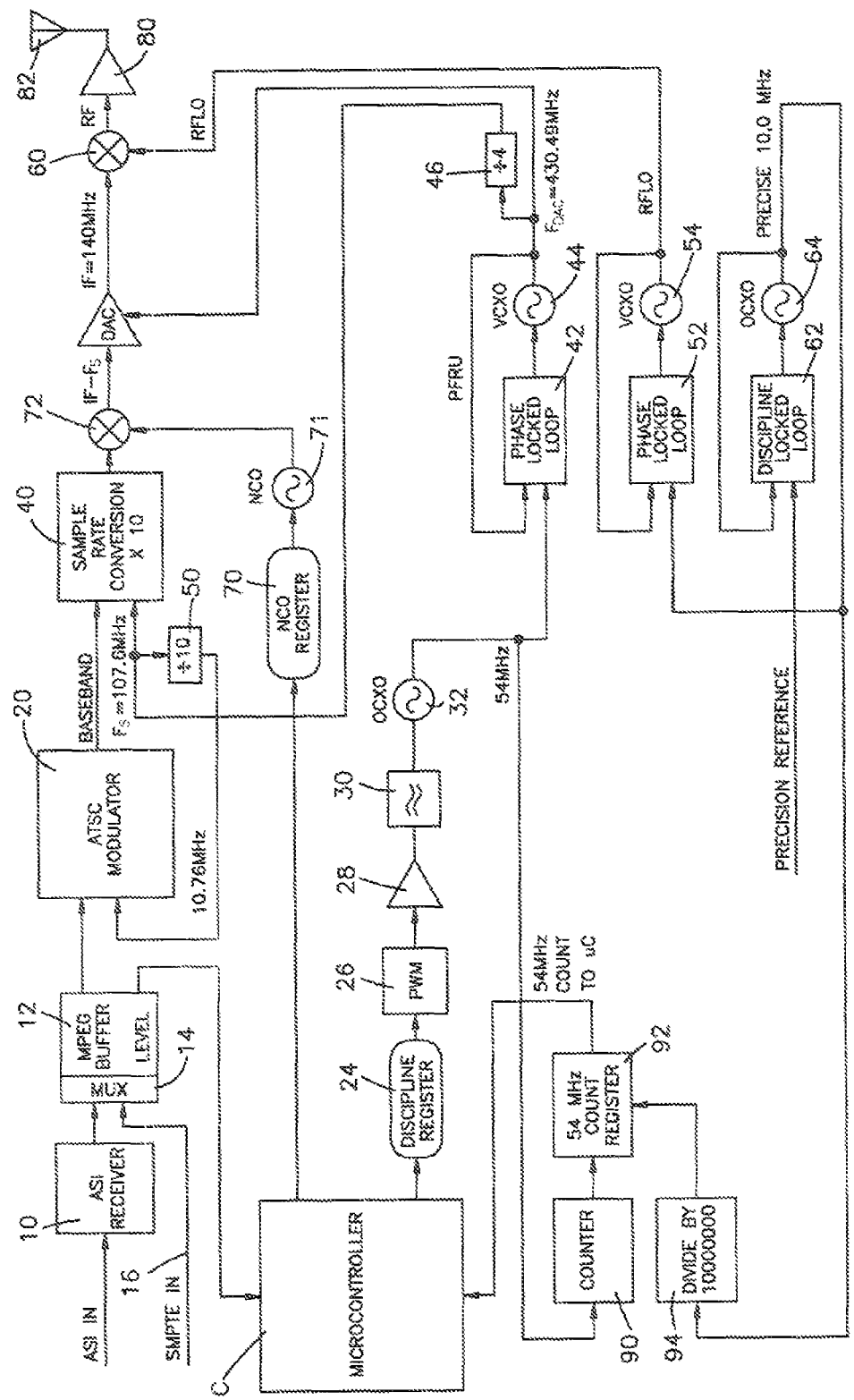
FIG. 2 illustrates a block diagram of an exciter employing pilot compensation in accordance with the present invention.

Reference is now made to FIG. 2. The exciter receives digital data which may originate as from a television or radio studio and transported as by microwave to the exciter. The exciter may be located at a transmitter station which may be several miles from the studio. The data is referred to herein as ASI in and it is received at a receiver 10 and is then supplied to a modulator-field programmable gate array (FPGA) 12. The input sample rate $F_S$ by the way of a multiplexer or MUX 14 is taken from an input SMPTE 16. The nominal input data rate is the SMPTE 310M rate of 19.393 Mbps. This is supplied to an ATSC modulator 20 at a clock rate of 10.76 MHz from the clock to be discussed hereinafter. The data is also supplied at the input sample rate to a programmed microcomputer C.

A 54 MHz oven-controlled crystal oscillator (OCXO) 22 is disciplined to the input sample rate by comparison of input data buffer fullness against a water mark level. The error in buffer level is input to a control loop that includes a register 24 that drives a pulse width modulator (PWM) 26 for purposes of controlling the rate of the oscillator 22. This is by way of an amplifier 28 and a control circuit 30. The data read from the buffer is controlled by the 54 MHz clock and thus will match the input data rate.

The output signal from the modulator 20 is supplied to a digital up converter (DUC) field programmable gate array (FPGA) 40. This is clocked in at a DUC sample clock $F_S$. The sample clock $F_S$ is obtained from a phase-locked loop arrangement which includes a phase-locked loop 42 that receives a precise 10.0 MHz signal (to be described below). The output of loop 42 is supplied to a crystal oscillator 44 that outputs a signal $F_{DAC}$ which is equal to 430.49 MHz and this is supplied as a clock to a digital-to-analog converter DAC. This signal, $F_{DAC}$, is divided by a factor of four by a divider circuit 46 to provide a sample clock $F_S$, at 107.6 MHz, and this is supplied to the programmable gate array 40. The sample clock $F_S$ is divided by a factor of 10 by a divider 50 and is supplied at 10.76 MHz to the modulator 20 for running thy modulator. A second phase lock circuit 52 also receives the precise 10.0 MHz clock and supplies this to another crystal oscillator 54 that produces the RF LO supplied to a multiplier 60.

The circuitry also includes a discipline loop 62 that receives a precision reference signal to an additional crystal oscillator OCXO (this is an oven-controlled crystal oscillator) 64. This oscillator provides the precise 10.0 MHz reference signal that is supplied to the phase lock loop 42.

An NCO register 70 receives a digital correction signal from the microcomputer C and controls an NCO oscillator 71 to produce an output signal IF–$F_S$ which is supplied to a multiplier 72 to beat against the baseband signal. This circuit, including computer C, is a digital correction compensator that supplies a digital correction signal to a digital circuit that includes register 70, NCO 71 and multiplier 60. The result is supplied to the digital-to-analog converter (DAC) which then supplies the intermediate frequency IF at 140 MHz to the multiplier 60 which produces the desired output signal. This is supplied to a suitable amplifier 80 and is broadcast as with a suitable antenna 82.

From the foregoing, it is to be noted that a signal is placed at the intermediate frequency IF of approximately 140 MHz as a result of oversampling by the DAC and offset in the digital up converter (DUC) field programmable gate array (FPGA). The DAC oversamples and places an image of the input at multiples of the DUC sample clock $F_S$. The DUC sample clock $F_S$ is ¼ DAC clock $F_{DAC}$. The digital signal is offset by a value equal to 140 MHz M$F_S$ so that the desired image outward from the DAC is at 140 MHz–$F_S$+$F_S$=140 MHz. The numerical controlled oscillator 71 creates a complex exponential which multiplies the baseband signal from the FDGA 40 and shifts the signal by the desired frequency offset.

The error in the buffer level modulator 12 is supplied to the microcomputer C and this signal is input to a control loop that drives a pulse width modulator 26 that controls the rate of the oscillator 22. The rate that data is read from the buffer 12 is controlled by the 54 MHz clock and thus will match the input data rate.

The 54 MHz clock is used as a reference into a phase locked loop that provides an oversampled DAC clock $F_{DAC}$ of 430.49 MHz nominal. This clock is divided by 4 to provide a DAC sample clock $F_S$, which in turn, is divided by 10 to provide a baseband sample clock of 10.76 MHz.

The 54 MHz clock applied to a counter 90 and the count is registered in a register 92 which is clocked at a rate of 1 PPS from a divider 94 that receives a precise clock of 10.0 MHz.

A digital compensator determines whether the pilot frequency is displaced and, if so, if the error is in counter 92. The error in the 54 MHz oscillator is calculated by counting the cycles in a one second interval. The precise 10 MHz oscillator is divided by 10,000,000 to regenerate the one pulse per second (1 PPS) signal. The counter 90 is driven by the 54.0 MHz clock and the count value is sampled at each one pulse per second occurrence. The difference from the ideal count of 54,000,000 is the error ($F_{error}$) in hertz.

$$Ferror = \text{Cycles in 1 pps} - 54000000$$

An error factor can be expressed as this ratio:

$$ErrorFactor = \frac{Ferror}{54 \text{ MHz}} = \frac{\text{Cycles in 1 } pps - 54000000}{54000000}$$

The 54 MHz clock and derived DAC/FPGA clock have this error factor:

$$ClockRatio = \frac{54 \text{ MHz} + Ferror}{54 \text{ MHz}} = \frac{\text{cycles in 1 } pps}{54000000}$$

Calculate the error in pilot distance.

$$\Delta F_{pilot} = -1/2 * (ErrorFactor) * \frac{1539}{2*143} \text{MHz}$$

Calculate the error in analog intermediate frequency frequency.

$$\Delta F_{IF} = ErrorFactor * 140 \text{ MHz}$$

Determine from desired RF frequency if spectrum will be inverted at intermediate frequency.

Calculate a compensation factor from these errors.

$$\Delta F\text{correction} = -\Delta F_{IF} - \Delta F_{pilot}$$

The correction must be applied in the DUC FPGA using the NCO. Since the NCO operates at the error clock rate, the correction factor must be compensated to achieve the actual correction. The NCO correction factor is defined by this equation:

$$\Delta F_{NCO} = \frac{\Delta F\text{correction}}{ClockRatio}$$

The final NCO correction can be simplified to this equation (with no spectral inversion).

$$\Delta F_{NCO} = \frac{Ferror * \left(\frac{1539 \text{ MHz}}{4*143} - 140 \text{ MHZ}\right)}{54 \text{ MHz} + Ferror}$$

If the spectrum is reversed at intermediate frequency, then the pilot contribution to the error will be reversed. The final NCO correction then would be:

$$\Delta F_{NCO} = \frac{Ferror * \left(\frac{-1539 \text{ MHz}}{4*143} - 140 \text{ MHz}\right)}{54 \text{ MHz} + Ferror}$$

Add the compensation factor from the nominal NCO offset value.

The resulting pilot location will be correct at RF.

An enhancement can be made to increase accuracy of this method by using a higher clock rate locked to the 54 MHz clock. The counts are larger which, in effect, gives a more accurate error estimate.

Another enhancement is to average current and previous 54 MHz counts to improve accuracy of the error estimate.

Another enhancement is to sample the error count more frequency to reduce errors caused by short term variation of the 54 MHz OCXO.

Although the invention has been described in conjunction with a preferred embodiment, it is to be appreciated that various modifications may be made without departing from the spirit and scope of the invention as defined by the appended claims.

We claim:

1. A digital exciter for use in RF broadcasting and having pilot signal compensation, comprising:
   an input digital circuit for receiving digital data at an input sample rate for use in RF broadcasting at a desired RF frequency and wherein a pilot frequency is displaced from a desired location of the frequency band because of an error in said input sample rate;
   a digital compensator that determines whether the pilot frequency is displaced and providing a digital correction signal in accordance therewith, said compensator further comprising a digital counter for counting clock pulses from a clock source to provide a count for use in providing an indication of any displacement of said pilot frequency; and
   a digital correction circuit for correcting said pilot frequency in accordance with said correction signal, the digital correction circuit comprising:
   a numerically controlled oscillator configured to provide an IF correction signal having a frequency that is a function of the digital correction signal; and
   a multiplier, receiving the IF correction signal and the IF digital signal as inputs, to produce the pilot signal compensated output.

2. An exciter as set forth in claim 1 wherein said compensator includes a count register for registering said count.

3. An exciter as set forth in claim 1 wherein said compensator includes a computer that is programmed to determine the extent of any said pilot frequency displacement based on said count and for supplying a correction signal in accordance therewith.

4. An exciter as set forth in claim 1 including a frequency conversion circuit that converts frequency to a higher digital intermediate frequency.

5. An exciter as set forth in claim 4 wherein said compensator includes a digital counter for counting clock pulses from a clock source to provide a count for use in indicating any said displacement.

6. An exciter as set forth in claim 4 wherein said compensator includes a computer that is programmed to determine the extent of any said frequency displacement as a function of said count and supply a correction signal in accordance therewith.

7. An exciter as set forth in claim 1 wherein said input digital circuit includes a digital modulator that outputs said digital data at a baseband signal frequency.

8. An exciter as set forth in claim 7 including a numerically controlled oscillator that supplies a frequency signal based on said correction signal for correcting said baseband frequency signal.

9. An exciter as set forth in claim 8 including a frequency up converter for converting said baseband signal as a corrected digital frequency signal.

10. An exciter as set forth in claim 9 including digital-to-analog conversion for providing corrected analog frequency output signals.

11. An exciter as set forth in claim 10 wherein said compensator includes a digital counter for counting clock pulses from a clock source to provide a count for use in providing an indication of any displacement of said pilot frequency.

12. An exciter as set forth in claim 11 wherein said compensator includes a count register for registering said count.

13. An exciter as set forth in claim 11 wherein said compensator includes a computer that is programmed to determine the extent of any said frequency displacement based on said count and for supplying a correction signal in accordance therewith.

14. A system for pilot signal compensation in an intermediate frequency (IF) digital signal comprising:
   a counter configured to count clock pulses from a clock source associated with the digital signal over a period of time to provide a clock count;
   a microcontroller configured to determine a digital correction signal from the clock count; and
   a digital correction circuit configured to correct the IF digital signal according to the digital correction signal to provide a pilot signal compensated output, the digital correction circuit comprising:
   a numerically controlled oscillator configured to provide an IF correction signal having a frequency that is a function of the digital correction signal; and
   a multiplier, receiving the IF correction signal and the IF digital signal as inputs, to produce the pilot signal compensated output.

* * * * *